(12) United States Patent
Donatiello et al.

(10) Patent No.: US 8,360,326 B2
(45) Date of Patent: Jan. 29, 2013

(54) METHOD FOR PRE-PERSONALIZING AN IC CARD

(75) Inventors: Saverio Donatiello, Mercogliano (IT); Corrado Guidobaldi, Naples (IT)

(73) Assignee: Incard S.A., Geneva (CH)

( * ) Notice: Subject to any disclaimer, the term of this patent is extended or adjusted under 35 U.S.C. 154(b) by 201 days.

(21) Appl. No.: 12/889,664

(22) Filed: Sep. 24, 2010

(65) Prior Publication Data

US 2011/0073662 A1 Mar. 31, 2011

(30) Foreign Application Priority Data

Sep. 25, 2009 (IT) .............................. MI2009A1637

(51) Int. Cl.
*G06K 19/06* (2006.01)
(52) U.S. Cl. ........................................ 235/492; 235/486
(58) Field of Classification Search .................. 235/375, 235/380, 492, 493, 486, 487
See application file for complete search history.

(56) References Cited

U.S. PATENT DOCUMENTS

| | | | | |
|---|---|---|---|---|
| 4,985,822 | A * | 1/1991 | Yamashita et al. | 700/13 |
| 5,038,025 | A * | 8/1991 | Kodera | 235/492 |
| 5,276,903 | A * | 1/1994 | Shinagawa | 712/37 |
| 5,841,475 | A * | 11/1998 | Kurihara et al. | 375/240.15 |
| 7,103,780 | B1 | 9/2006 | Brieussel | 713/193 |
| 2003/0006279 | A1* | 1/2003 | Saeki | 235/380 |
| 2006/0114728 | A1 | 6/2006 | Lin et al. | 365/189.05 |
| 2006/0289659 | A1* | 12/2006 | Mizushima | 235/492 |
| 2007/0136797 | A1* | 6/2007 | Tanabikiq et al. | 726/6 |
| 2008/0162837 | A1* | 7/2008 | Ogawa | 711/159 |
| 2011/0138088 | A1* | 6/2011 | Sirio et al. | 710/106 |

FOREIGN PATENT DOCUMENTS

| | | |
|---|---|---|
| EP | 0 357 361 | 3/1990 |
| EP | 1 376 458 | 1/2004 |
| EP | 1 473 737 | 11/2004 |

\* cited by examiner

*Primary Examiner* — Thien M Le
(74) *Attorney, Agent, or Firm* — Allen, Dyer, Doppelt, Milbrath & Gilchrist, P.A.

(57) ABSTRACT

A method for pre-programming an IC card may include transmitting a memory image of a gold version sample IC card to the IC card and storing the memory image in a memory of the IC card. The method may further include dividing the memory image into memory blocks of set size to be transmitted separately to the IC card and by the fact that the storing may include writing at least one memory block in the memory while one or more memory blocks are transmitted.

15 Claims, 8 Drawing Sheets

| EEPROM size (Kbytes) | 16 | 32 | 64 | 72 | 128 | 256 |
|---|---|---|---|---|---|---|
| Num. of ADPU | 64.25 | 128.5 | 257 | 289.13 | 514 | 1028 |
| GS loading time (msec) | 2082 | 4164 | 8327 | 9268 | 16654 | 33308 |

| EEPROM size (Kbytes) | 16 | 32 | 64 | 72 | 128 | 256 |
|---|---|---|---|---|---|---|
| Num. of ADPU | 64.25 | 128.5 | 257 | 289.13 | 514 | 1028 |
| GS loading time (msec) | 1696 | 3392 | 6785 | 7633 | 13570 | 27410 |

| EEPROM size (in Kbytes) | 16 | 32 | 64 | 72 | 128 | 256 |
|---|---|---|---|---|---|---|
| Num. of ADPU | 32.13 | 64.25 | 128.5 | 144.5 | 257 | 514 |
| GS loading time (msec) | 848 | 1696 | 3393 | 3816 | 6785 | 13570 |
Fig. 8
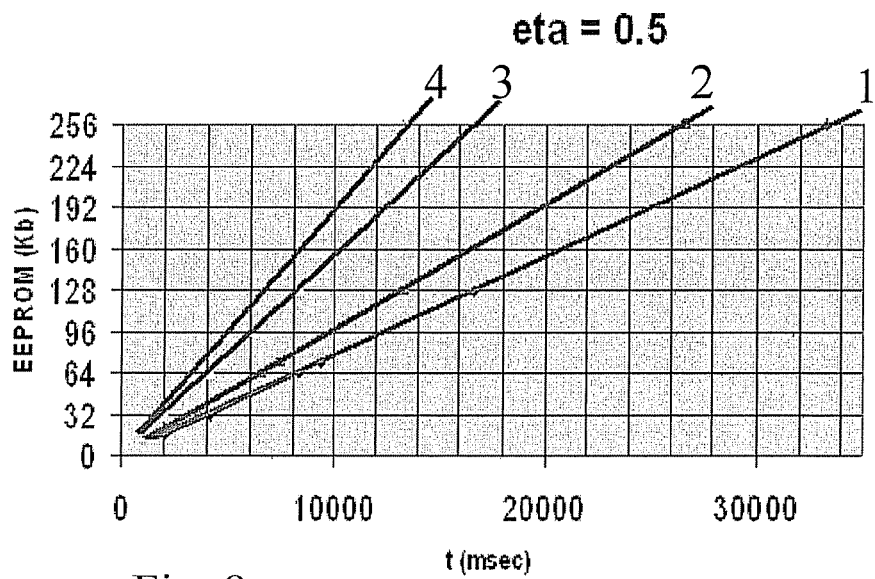
Fig. 9a
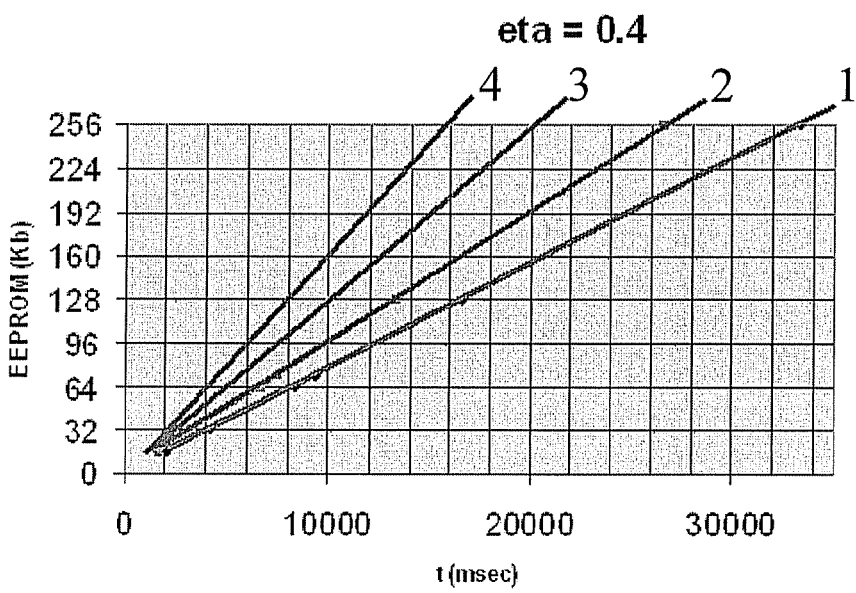
Fig. 9b

METHOD FOR PRE-PERSONALIZING AN IC CARD

FIELD OF THE INVENTION

The present invention relates to an integrated circuit card and related methods therefor and, more particularly, to a method of pre-programming the integrated circuit card.

BACKGROUND OF THE INVENTION

A method for pre-programming (pre-personalizing) an integrated circuit (IC) Card may comprise the steps of transmitting a memory image of a gold version sample IC card to the IC card and storing the memory image in a memory of the IC card to be pre-programmed. The gold version sample IC card is an IC card including a memory where libraries and pre-programmed data are stored, together with a plurality of programs which are already installed and linked with the libraries.

The method for pre-programming may provide for copying the memory image of the gold version sample IC card, including the executable programs, inside thousands of memories of corresponding IC cards to be pre-programmed, thus avoiding a repetition of the steps of installing and linking the plurality of programs for each IC cards to be pre-programmed. In order to further reduce the time involved in the pre-personalization of IC cards, it may be important to reduce the time used to execute the steps of transmitting and storing.

With reference to FIG. 1a, a schematic diagram represents the time involved for transmitting a memory block 111 of predetermined size Y, for example, an application protocol data unit (APDU) having a size Y of 260 bytes, and the time for storing such memory block in a memory or Electrically Erasable Programmable Read-Only Memory (EEPROM) of the IC card to be pre-programmed. The transmission time of one byte over a channel between the gold version sample IC card and the IC card to be pre-programmed may be 0.93 µs, and a time for writing a block 112 of 64 bytes in the memory or EEPROM of the IC card may be 2 ms. In this case, a time used to transmit the memory block of 260 bytes is 260*0.93 µs=24.2 ms, and a time spent to write such memory block is 4*2 ms=8 ms. Moreover, an acknowledgement message SW may be returned to the gold version sample IC card in 0.2 ms. Under the circumstances given above, the memory block of 260 bytes may be transmitted and stored in 32.4 ms and a memory image of 16 Kb of the gold version sample IC card may be transmitted in 64.25 memory blocks, i.e. in 64.25*32.4 ms, or 2082 ms.

The table represented in FIG. 1b reports the number of memory blocks, also indicated as "Num. of APDU", used to transmit a memory image with predetermined size, and the corresponding loading time. For example, a memory image of 256 Kb may use 1028 memory blocks of 260 bytes and 33308 ms.

SUMMARY OF THE INVENTION

The present disclosure may include an approach to the problem of reducing the time involved in the pre-personalization of an IC card. The pre-personalization may be executed by transmitting the memory image of a gold version sample IC card to a plurality of IC cards to be pre-programmed. The approach also may reduce the time for storing such memory image inside the IC card, thus improving the throughput of the pre-personalization process.

The present invention may relate to a method for pre-programming an IC card that may comprise transmitting a memory image of a gold version sample IC card to the IC card and storing the memory image in a memory of the IC card to be pre-programmed. More particularly, the method may be executed by an IC card manufacturer on a plurality of IC cards to be pre-programmed with executable programs already installed and linked with libraries within the gold version sample IC card.

The present invention further may relate to an IC card including a memory to be pre-programmed, means to receive or a receiver configured to receive a memory image of a gold version sample IC card, and means for storing or a memory configured to store the memory image in a memory to be pre-programmed. The approach may include dividing a memory image of a gold version sample IC card in a plurality of memory blocks which are transmitted separately to an IC card to be pre-programmed, and storing the memory blocks already received by the IC card while other memory blocks are transmitted.

In other words, the approach is that of storing a portion of the memory image of the gold version sample IC card inside the IC card to be pre-programmed while another portion of the same memory image is transmitted to the IC card, thus performing the transmission and the storing steps in parallel. Thus, the step of storing is not delayed by the step of transmitting, since it is executed on a portion of the memory image while another portion is transmitted.

Advantageously, according to the method of the present disclosure, a step of transmitting a memory block from the gold version sample IC card may be executed in parallel, i.e. contemporarily, with a step of storing another memory block, and the overall time involved for the pre-personalization may be reduced. The step of storing the memory image may be anticipated and executed during the transmission of the same memory image.

According to an aspect of the present disclosure, a predetermined number of memory blocks may be compressed in compressed memory blocks of reduced size to be transmitted to the IC cards to be pre-programmed, and the compressed memory blocks may be decompressed in the IC card to be pre-programmed. Advantageously, a time spent to transmit and decompress a compressed memory block of size A may be less than a time used to transmit a non-compressed memory block of size B, and thus the step of transmitting and storing are further improved.

According to another embodiment, the memory image of the gold version sample IC card may be compressed in a compressed memory image before being divided into a plurality of compressed memory blocks, and the compressed memory blocks may be decompressed inside the IC card to be pre-programmed. Advantageously, according to this embodiment, a number of memory blocks used to transmit the memory image to the IC card to be pre-programmed may be reduced since the memory image of the gold version sample IC card is compressed and transmitted in fewer memory blocks, thus, also the time for transmitting and storing the memory image may be reduced.

More particularly, the step of decompressing may be executed on a portion of the memory image and in parallel with the step of transmitting another portion of such memory image, so that it is not delayed by the transmission. In other words, the step of decompressing may be executed as soon as a first portion of the memory image is received from the IC card to be pre-programmed and it does not wait the entire memory image.

According to the above approach, an approach to the technical problem may be a method for pre-programming an IC card. The method may comprise transmitting a memory image of a gold version sample IC card to the IC card, and storing the memory image in a memory of the IC card, characterized by comprising the step of separating the memory image in a plurality of memory blocks of predetermined size to be transmitted separately to the IC card and by the fact that the step of storing comprises writing at least one memory block in the memory while one or more memory blocks are transmitted.

More particularly, the step of separating may further comprise the step of compressing the plurality of memory blocks of predetermined size to be transmitted in a corresponding plurality of memory blocks of reduced size and by the fact that the step of storing may further comprise decompressing the plurality of memory blocks of reduced size into the plurality of memory blocks of predetermined size. The step of decompressing may decompress one memory block while another memory block is transmitted.

The step of decompressing may be activated by a scheduler of the IC card after at least one of the memory blocks of reduced size is stored in a first data buffer of the IC card. In some embodiments, the step of writing may be activated by the scheduler after one of the plurality of memory blocks of reduced size stored in the first data buffer is decompressed and stored in a second data buffer of the IC card. The step of writing may be executed on a decompressed memory block while another memory block is decompressed and/or while a further memory block is transmitted.

Another aspect is an IC card that may include a memory to be pre-programmed, a receiver configured to receive a memory image of a gold version sample IC card, and a memory configured to store the memory image in the memory to be pre-programmed, characterized by the fact that the memory may comprise a first data buffer where at least one memory block of predetermined size of the memory image is stored to be written in the memory while one or more memory blocks enter the receiver.

Further technical features and advantages of the method to pre-personalize IC cards and the corresponding IC cards may be apparent from the description give here below only for exemplificative purpose and without limiting the scope of protection of the present invention.

BRIEF DESCRIPTION OF THE DRAWINGS

FIG. 3b is a schematic diagram representing the gold version sample IC card and the IC card to be pre-programmed, according to an embodiment of FIG. 3a;

FIG. 4b is a schematic diagram representing the gold version sample IC card and the IC card to be pre-programmed, according to the embodiment of FIG. 4a;

FIG. 5a is a schematic diagram representing a time for transmitting and storing a memory block of the memory image of the gold version sample IC card, according to the embodiment of FIG. 2a;

FIG. 5b is a table reporting a number of memory blocks and the corresponding time used to transmit and store the memory image with predetermined size of the gold version sample IC card, according to the embodiment of FIG. 2a;

FIG. 6 is a schematic diagram representing a time for transmitting and storing the memory block of the memory image of the gold version sample IC card, according to the embodiment of FIG. 3a;

FIG. 8 is a table reporting a number of memory blocks and the corresponding time spent to transmit and store the memory image of predetermined size of the gold version sample IC card, according to the embodiment of FIG. 3a;

FIG. 9a is a graph comparing the time spent to transmit and store the memory image of the gold version sample IC card according to the prior art and according to three different embodiments of the present invention, with a corresponding compression factor eta=0.5;

FIG. 9b is a graph comparing the times of FIG. 9a, with a compression factor eta=0.4;

DETAILED DESCRIPTION OF THE PREFERRED EMBODIMENTS

Figure 2A:
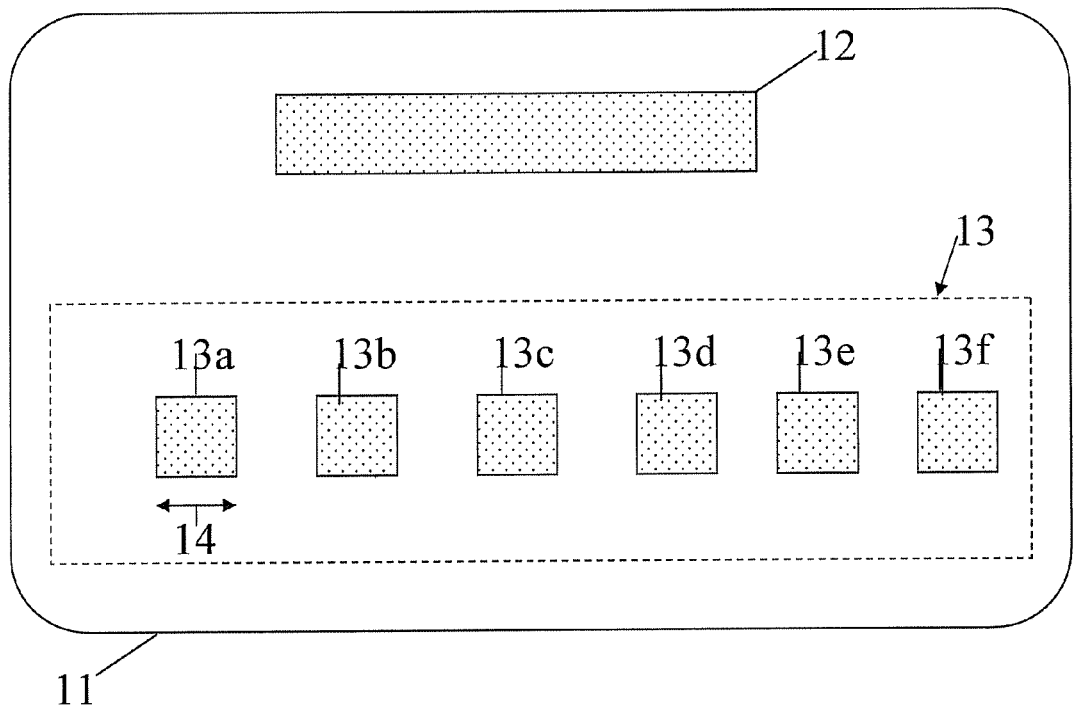
FIG. 2a is a schematic diagram representing a gold version sample IC card, according to the present invention.
Figure 2B:
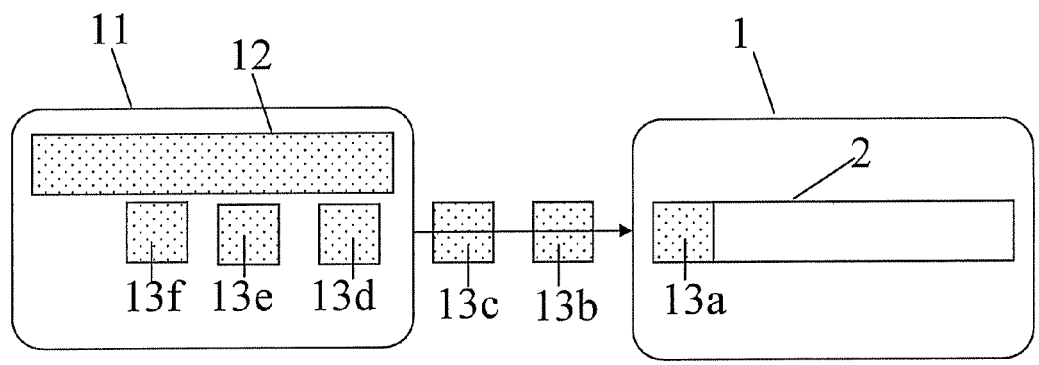
FIG. 2b is a schematic diagram representing the gold version sample IC card of FIG. 2a and an IC card to be pre-programmed, according to the method of the present invention.

With reference to FIGS. 2a-2b, the main steps of a method for pre-programming (pre-programming or pre-flashing) an IC card 1 according to the present disclosure are schematically represented, including the step of providing a gold version sample (factory) IC card 11, i.e. an IC card including a memory 12 wherein libraries and pre-programmed data are stored, together with a plurality of programs which are already installed in the memory 12 and linked with the libraries, i.e. programs ready to be executed. More particularly, the method comprises the steps of transmitting the memory image 12 of the gold version sample IC card 11 to the IC card 1 and storing the memory image 12 in a memory 2 of the IC card 1 to be pre-programmed. The above steps are executed by an IC card manufactured which substantially programs a copy of the memory image 12 of the gold version sample IC card 11 inside thousands of memories 2 of corresponding IC cards 1 to be pre-programmed, thus avoiding a repetition of the steps of installing and linking thousand of times, i.e. for each IC card to be pre-programming, and reducing the time involved in the overall pre-personalization process.

According to the present disclosure, the method further comprises the step of separating (dividing) the memory image 12 in a plurality of memory blocks 13 of predetermined size 14 to be transmitted separately to the IC card 1 and by the fact that the step of storing comprises writing at least one memory block 13a in the memory 2 while one or more memory blocks 13b-13c are transmitted.

FIG. 2a schematically represents the gold version sample IC card 11 including the memory image 12 and memory blocks 13a-13f and FIG. 2b represents a connections between the gold version sample IC card 11 of FIG. 2b and the IC card 1 to be pre-programmed, including the memory 2, while some memory blocks 13c, 13b are transmitted and another memory block 13a is separately stored in the memory 2. The gold version sample IC card 11 comprises separating means or a separation module configured to divide the memory image 12 in memory blocks 13a-13f and transmitting means or a transmitter to separately transmit such memory blocks 13a-13f to the IC card 1. As represented in FIG. 2b, while one or more memory blocks 13c, 13b are transmitted to the IC card 1, a memory block 13a already received by the IC card 1 is stored in the memory 2 and other memory blocks 13d-13f are still stored inside the gold version sample IC card, ready to be transmitted.

Figures 5A, 5B:
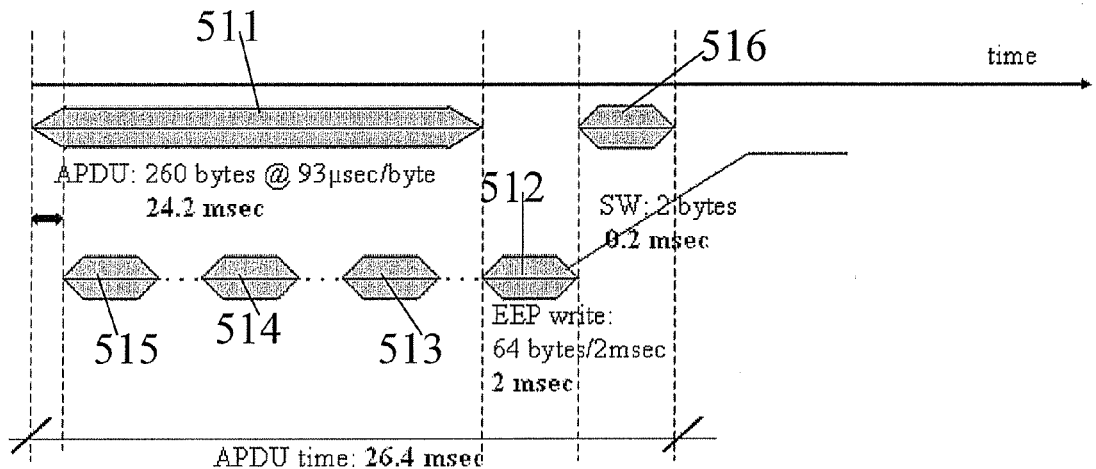

Advantageously, according to the method of the present disclosure, the step of transmitting one or more memory blocks from the gold version sample IC card 11 is executed in parallel, i.e. contemporarily, to the step of storing other memory blocks in the IC card 1 to be pre-programmed, thus reducing the overall time involved in the pre-personalization of the IC card 1, as may be apparent from FIG. 5a.

More particularly, FIG. 5a schematically represents a time involved for transmitting and storing a memory block 511 of predetermined size Y, for example, an APDU having a size Y of 260 bytes and including at least a portion of the executable programs of the memory image of the gold version sample IC card. The transmission time of one byte over a connection or channel between the gold version sample IC card 11 and the IC card 1 to be pre-programmed is supposed to be 0.93 μs and a time for writing a block 512 of 64 bytes in the memory 2 of such IC card 1 is supposed to be 2 ms.

The transmission capacity of such connection or channel and the writing time of the EEPROM is given only for exemplary purposes and are typical, thereby allowing an easy comparison of the throughput of the method to pre-personalize of the present disclosure with respect to the typical method throughput. As it is apparent from FIG. 5a, the time for transmitting the memory block 511 of 260 bytes is 260*0.93 μs=24.2 ms.

Advantageously, according to the method of the present disclosure, the time spent to write the memory block 512 is only 2 ms and not 8 ms as in the prior art method. In fact, the memory block or APDU 511 is separated in four memory blocks 512-515 of 64 bytes and while a first separated memory block 512 is written in the memory 2 or EEPROM of the IC card 1, the second to fourth separated memory blocks 513-515 of 64 bytes are transmitted to the IC card 1. Thus, the overall time involved in transmitting and storing the memory block or APDU 511 in separated memory blocks 512-515 is reduced from 32.4 ms to 26.4 ms, comprising the time for transmitting the four separated memory blocks 512-515, the time for storing such memory blocks 512-515 and the time of 0.2 ms for returning an acknowledge message SW from the IC card 1 to the gold version sample IC card 11.

Under the circumstances given above, a memory image of 16 Kb, including 64.25 memory blocks or APDUs, is transmitted in 64.25*26.6 ms=1696 ms. The table represented in FIG. 5b reports the number of memory blocks or APDUs, also indicated as "Num. of APDU", used to transmit the memory image 12 with a predetermined size of 16, 32, 64, 72, 128 and 256 Kb, and the corresponding loading time. For example, a memory image of 256 Kb uses 1028 memory blocks of 260 bytes and 274 10 ms. Advantageously, the time for pre-programming an IC card 1 is reduced, for example, for the memory image of 256 Kb, from 33308 ms for transmitting and storing according to the prior art method to 27410 ms for transmitting and storing according to the method of the present disclosure.

According to an embodiment of the present disclosure, the step of separating further comprises the step of compressing the plurality of memory blocks 13 of predetermined size 14 to be transmitted in a corresponding plurality of memory blocks 15 of reduced size 16 and the step of storing further comprises decompressing the memory blocks 15 of reduced size 16 in the memory blocks 13 of predetermined size 14.

Figure 3A:
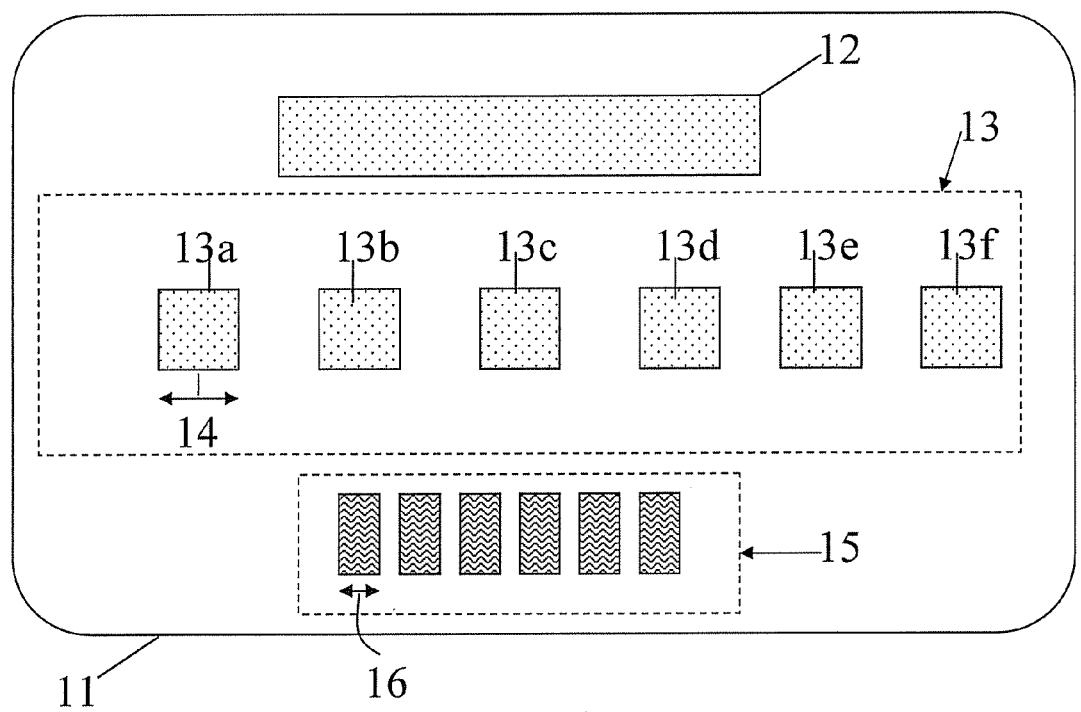
FIG. 3a is a schematic diagram representing the gold version sample IC card, according to the present invention.
Figure 3B:
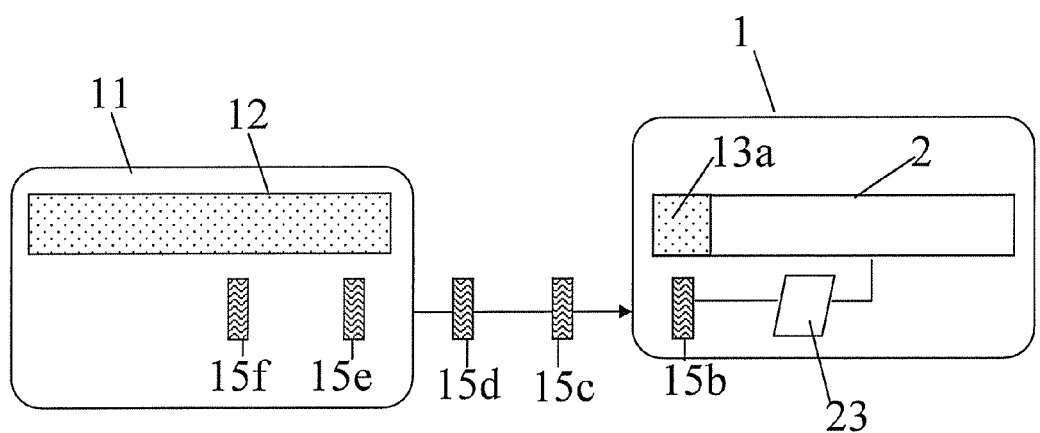

In some embodiments, a compression/decompression algorithm LZW having a compression factor between 30% and 50% is stored inside the gold version sample IC card 11 and inside the IC card 1 to execute the corresponding compression and decompression. This embodiment is schematically represented with reference to FIG. 3a-3b, wherein the memory blocks 13a-13f of gold version sample IC card 11 are compressed in corresponding memory blocks 15 of reduced size 16, and with reference to FIG. 3b, wherein the connection between the gold version sample IC card 11 and the IC card 1 is schematically represented.

More particularly, while one or more memory blocks 15c, 15d of reduced size 16 are transmitted to the IC card 1, another memory block 15b of reduced size 16 is already within the IC card 1 and it is processed by a decompressor 23 of the IC card 1. This is in order to extract the corresponding memory block 13b of predetermined size 14, and a further memory block 13a of predetermined size 14, i.e. a memory block already decompressed, is stored inside the memory 2 of the IC card 1.

Advantageously, the time for transmitting and decompressing the compressed memory blocks of size 16 is less than the time for transmitting the memory blocks of size 14, thus the step of transmitting and storing is further improved. Moreover, the step of transmitting memory blocks of reduced size, the step of decompressing such blocks within the IC card 1, and the steps of storing the memory blocks of predetermined size are executed in parallel and on separate memory block of the memory image 12. The step of decompressing is not delayed by the step of transmitting because it is executed on a separate memory block of the memory image. Also the step of storing it is not delayed by the steps of decompressing and transmitting because they are executed on a separate memory blocks.

Figure 7:
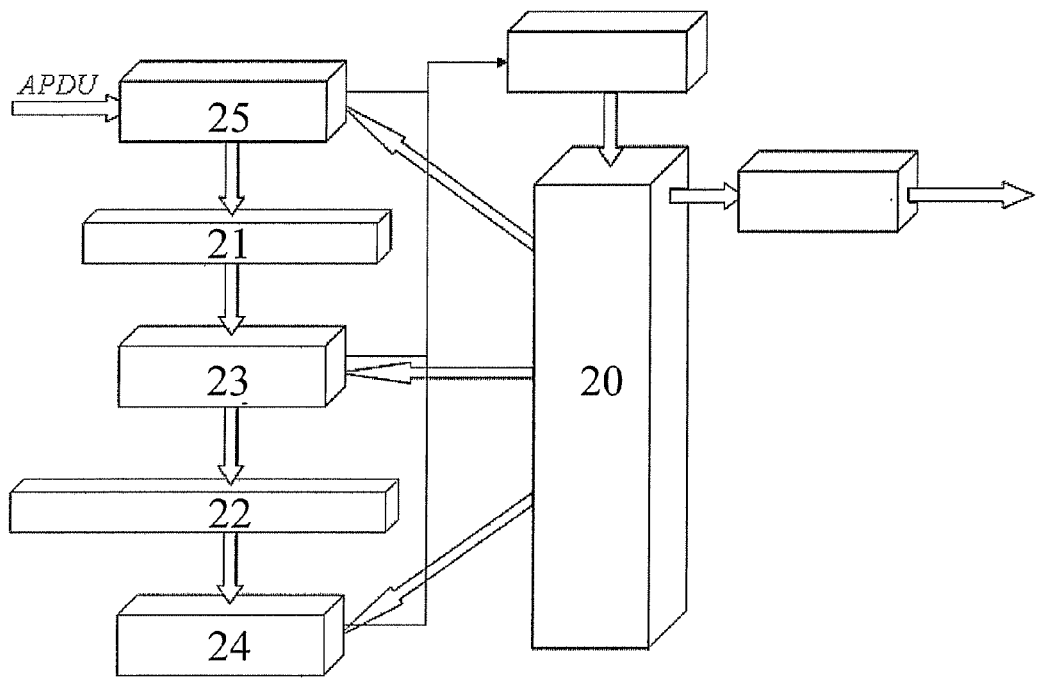
FIG. 7 is a schematic diagram representing a scheduler of the IC card, according to the present invention.

More particularly, the step of decompressing is activated by a scheduler 20 of the IC card 1, as schematically represented in FIG. 7, which activates the decompressor 23 after at least one of the memory blocks 15 of reduced size 16 is stored in a data buffer 21 of the IC card 1. Also, the step of writing is activated by the scheduler 20, activating corresponding IC card writing means or an IC card write module 24 after one or more of the memory blocks 15 of reduced size 16 stored in the data buffer 21 is decompressed and stored in a second data buffer 22 of the IC card 1.

The steps of decompressing and writing are contemporaneously activated by the scheduler 20, respectively on memory blocks 15 of reduced size 16 and on memory blocks 13 of predetermined size 14, respectively stored in the data buffer 21 and in the second data buffer 22. Advantageously, according to this embodiment of the present disclosure, the memory blocks 15a-15f transmitted have a reduced size 16 and thus the transmission time per each memory block 15a-15f is also reduced. Moreover, the step of transmitting, decompressing, and storing are executed in parallel on separated memory blocks, thus improving the throughput of the pre-personalization process.

According to another embodiment of the present disclosure, the method for pre-programming the IC card 1 comprises the steps of transmitting the memory image 12 of the gold version sample IC card 11 to the IC card 1 and storing the memory image 12 in the memory 2 of the IC card 1. The method also comprises compressing the memory image 12 in a compressed memory image 12a of reduced size; separating the compressed memory image 12a in a plurality of compressed memory blocks 17 of predetermined size 18 to be transmitted separately; and decompressing at least one compressed memory block 17b while one or more compressed memory blocks 17c are transmitted.

Figure 4A:
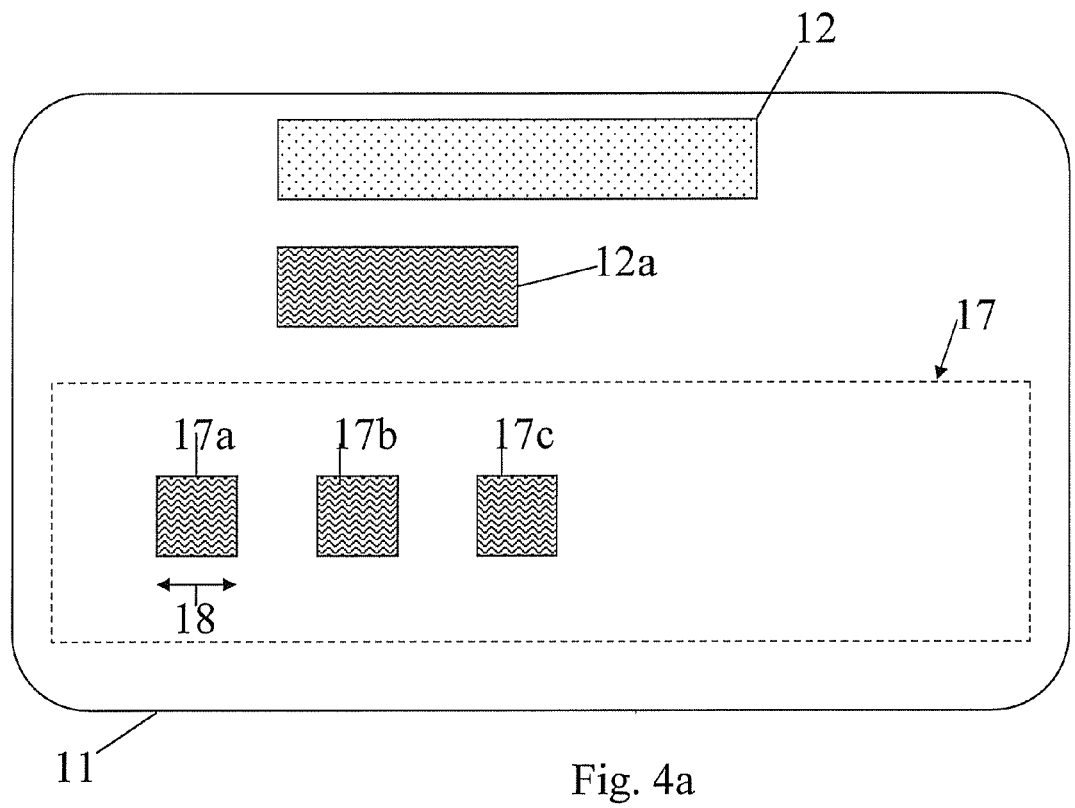
FIG. 4a is a schematic diagram representing the gold version sample IC card, according to another embodiment of the present invention.
Figure 4B:
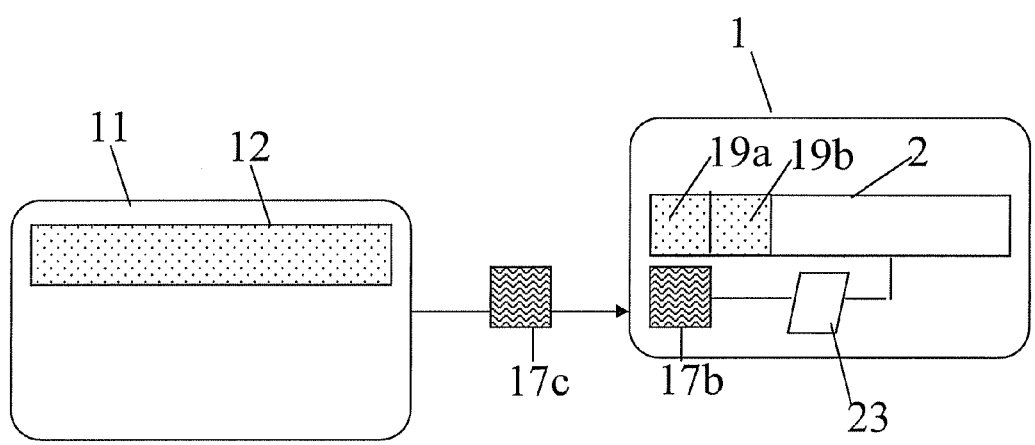

This embodiment is schematically represented with reference to FIG. 4a, wherein the memory image 12 is compressed in the compressed memory image 12a of reduced size by a compressor stored in the gold version sample IC card 11, and is separated in memory blocks 17 of predetermined size 18. In FIG. 4b, a connection between the gold version sample IC card 11 and the IC card 1 to be pre-programmed is schematically represented, the IC card 1 including the decompressor 23 and the memory image 2. More particularly, while the memory block 17c of predetermined size 18 is transmitted to the IC card 1, another memory block 17b of predetermined size, already transmitted to the IC card 1, is decompressed and two further memory blocks 19a, 19b already decompressed are stored in the memory 2.

Figure 6:
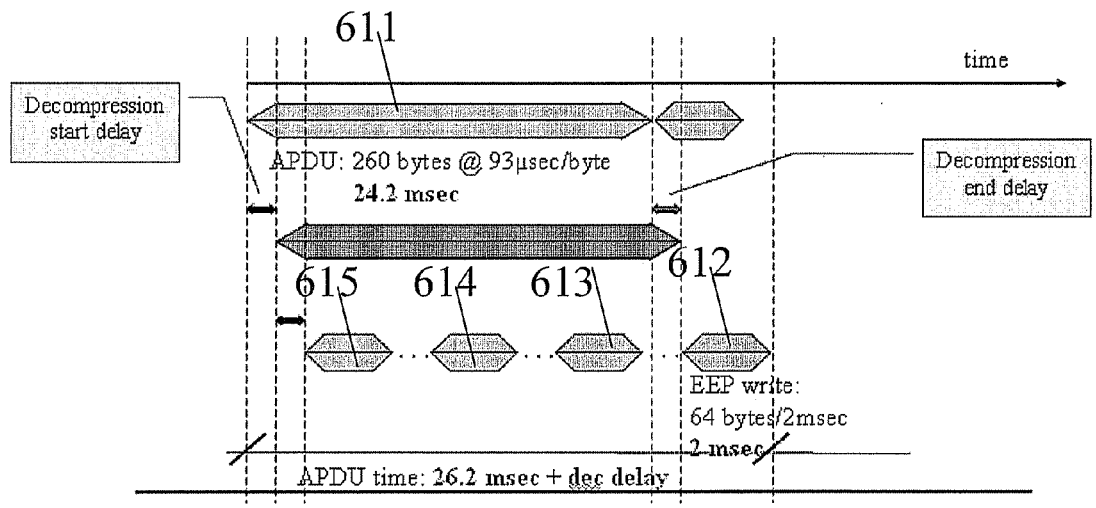

Advantageously, the step of transmitting memory blocks of size 18, the step of decompressing such blocks within the IC card 1, and the steps of storing the decompressed memory blocks 13 are executed in parallel, thus further improving the throughput process. With reference to FIG. 6, the time for transmitting and storing a memory block 611 of predetermined size Y, for example an APDU having a size Y of 260 bytes, according to this last embodiment, with a compression/decompression factor of 50%, is schematically represented.

As described above, it is supposed that the transmission time of one byte over the connection or channel between the gold version sample IC card 11 and the IC card 1 to be pre-programmed is 0.93 µs, and the time for writing a memory block of 64 bytes in the memory 2 is 2 ms. Thus, also in this case, the time for transmitting the memory block 611 of 260 bytes is 260*0.93 µs=24.2 ms.

Advantageously, the time for writing the memory block 611 is only 2 ms because, while a first separated memory block 612 of 64 bytes of the memory block or APDU is written in the memory 2 or EEPROM of the IC card 1, the second to fourth 613-615 separated memory blocks of 64 bytes of such memory block or APDU are transmitted to the IC card 1. Thus, the overall time involved in transmitting and storing the memory block or APDU 611 is reduced from 32.4 ms to 26.4 ms comprising the time for transmitting the four separated memory blocks 612-615, the time for storing such memory blocks 612-615 and the time of 0.2 ms for returning an acknowledge message SW from the IC card 1 to the gold version sample IC card 11.

Figures 1A, 1B:
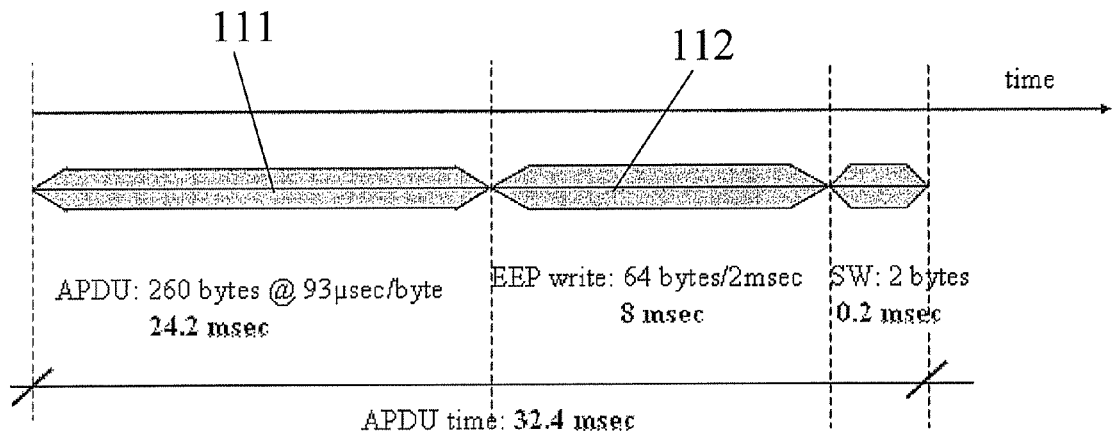
FIG. 1a is a schematic diagram representing a time for transmitting and storing a memory block of a memory image of a gold version sample IC card, according to the prior art.
FIG. 1b is a table reporting a number of memory blocks and the corresponding time used to transmit and store the memory image of the gold version sample IC card with a predetermined size, according to the prior art.

Moreover, according to this embodiment, a further reduction in the pre-personalization is achieved because the number of memory blocks 17 to be transmitted is reduced, since the memory image 12a is compressed before being separated in memory blocks 612-615. As schematically represented in FIG. 8, the number of memory blocks or APDUs 611 for transmitting a memory image of 16 Kb is reduced from 64.25 (FIG. 1b) to 32.13, and thus the time for transmitting and storing the memory image is reduced from 1696 ms (FIG. 1b) to 848 ms.

The table of FIG. 8 reports the number of memory blocks 611, also indicated as "Num. of APDU", used to transmit the memory image 12, having a predetermined size of 16, 32, 64, 72, 128 and 256 Kb, and the corresponding loading time. For example, a memory image of 256 Kb uses 514 memory blocks 611 of 260 bytes and 13570 ms. The step of storing further comprises writing at least a decompressed memory block 19a, 19b in the memory 2 of the IC card 1 while one or more compressed memory blocks 17c are transmitted and/or decompressed.

The step of decompressing and/or the step of writing is activated by the scheduler 20 of the IC card 1, respectively, after at least one of the compressed memory blocks 17 of predetermined size 18 is stored in the data buffer 21 of the IC card 1 and/or after at least one of the decompressed memory blocks 19a, 19b is stored in a second data buffer 22 of the IC card 1.

Figure 9C:
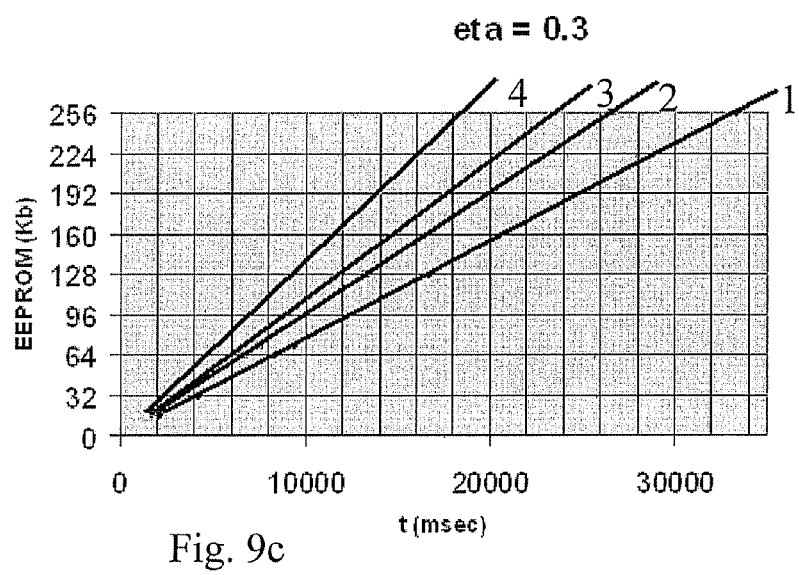
FIG. 9c is a graph comparing the times of FIG. 9a, with a compression factor eta=0.3.

FIG. 9a-9c represents diagrams for the time for transmitting and storing the memory image 12 of the gold version sample IC card 11 of a given size between 16 Kb and 256 Kb, according to different embodiments of the present disclosure and of the prior art method. More particularly, line 1 of FIG. 9a represents the time for transmitting and storing the memory image 12 according to the prior art method; line 2 represents such time according to a first embodiment (FIG. 2a-2b) of the present disclosure wherein the transmission step is executed in parallel with the storing step, on separated memory blocks 13 of the memory image; and line 3 represents the above time according to a second embodiment of the present disclosure wherein the memory image 12 is compressed in a compressed memory image 12a, with an algorithm having a compression factor eta=0.5, and transmitted to the IC card to be pre-programmed. Line 4 represents the time for transmitting and storing according to a third embodiment (FIG. 4a-4b) of the present disclosure, wherein the transmission step is executed on separated memory blocks 17 of the memory image 12, which is compressed before transmission with an algorithm having a compression factor eta=0.5, and wherein the transmission step is executed in parallel with the storing step on separated memory blocks 17 already transmitted.

Figure 10:
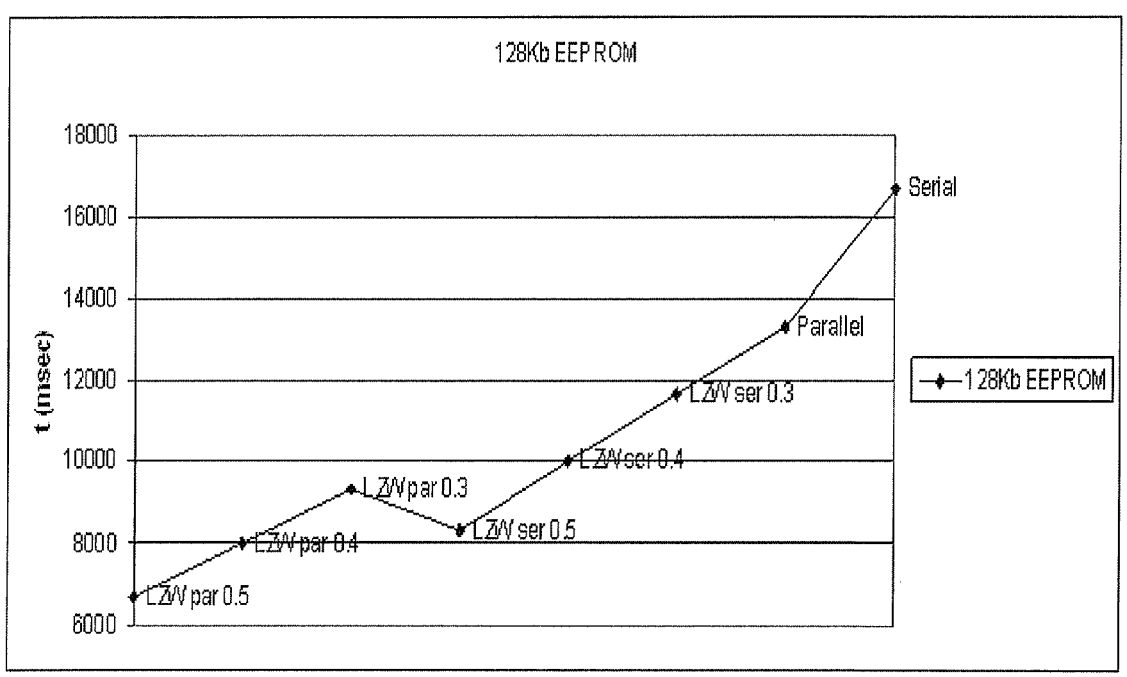
FIG. 10 is a schematic diagram representing, in a different diagram, the results of FIGS. 9a-9c.

FIGS. 9b and 9c represent the same graphics of FIG. 9a with a different compression factor of eta=0.4 and eta=0.3. FIG. 10 represents, in a different diagram, the results of FIGS. 9a-9c. More particularly, the label "LZW par 0.x" indicates an execution in parallel (par) of the transmission step and the storing step with a compression factor of 0.x and the label "LZW ser 0.x" indicates a serial execution (ser) of such steps, with a compression factor of 0.x. The label "serial" represents the result of the prior art method and "parallel" the results of executing the transmission and storing in parallel but without compression.

The present disclosure further relates to an IC card 1 including a memory 2 to be pre-programmed, and comprising means to receive or a receiver 25 configured to receive a memory image 12 of a gold version sample IC card 11 and means for storing or a memory 24 configured to store the memory image 12 in the memory 2 to be pre-programmed. According to the present disclosure, the memory 24 comprises a data buffer 21 wherein at least one memory block 13a of predetermined size 14 of the memory image 12 is stored to be written in the memory 2 while one or more memory blocks 13b enter the receiver 25. More particularly, the IC card comprises a decompressor 23 to decompress the at least one memory block 13 of predetermined size 14 stored in the data buffer 21.

The receiver 25 stores the memory blocks 13 of predetermined size 14 in the data buffer 21 and the memory 24 further comprises a second data buffer 22 wherein memory blocks 13 already decompressed are stored. More particularly, the IC card comprises a scheduler 20 having an input connected to an output of the decompressor 23, to an output of the memory 24, and to an output of the receiver 25. The scheduler has an output connected to an input of the decompressor 23, to an input of the memory 24, and to an input of the receiver 25.

The input of the scheduler 20 is programmed to receive an interrupt from the output of the decompressor 23, when the memory block 13 has been decompressed, an interrupt from the output of the memory 24, when a memory block 13 has been written in the memory 2, or an interrupt from the output of the receiver 25, when a memory block 13 has been received. The output of the scheduler 20 sends an activation command to the input of the decompressor 23, when a memory block 13 is stored in the data buffer 21 to be decompressed and an activation command to the input of the memory 24, when a memory block 13 is stored in the second data buffer 21, to be written in the memory 2.

Advantageously, according to the method of the present disclosure, the transmission of memory blocks from the gold version sample IC card is executed in parallel with the storing of other memory blocks in the IC card to be pre-programmed, and the time for the pre-personalization of an IC card is reduced because the step of storing the memory image is anticipated and executed during the transmission of the same memory image. Advantageously, the transmission time is further reduced with respect to the prior art because the time for transmitting and decompressing compressed memory blocks of size A is less than the time for transmitting a non compressed memory block of greater size B. Advantageously, the number of memory blocks for transmitting the memory image to the IC card to be pre-programmed is reduced, since the memory image is compressed and transmitted, thus, also the time for transmitting and storing the memory image is reduced.

That which is claimed:

1. A method for pre-programming a memory of an integrated circuit (IC) card with a memory image of a gold version factory sample IC card, the method comprising:
   dividing the memory image into a plurality of memory blocks of a set size;
   separately transmitting each of the plurality of memory blocks to the IC card; and
   writing at least one memory block in the memory while at least one memory block is transmitted.

2. The method according to claim 1 further comprising:
   compressing the plurality of memory blocks of set size to be transmitted into a corresponding plurality of memory blocks of reduced size; and
   decompressing the plurality of memory blocks of reduced size into the plurality of memory blocks of set size.

3. The method according to claim 2 wherein the decompressing is activated by a scheduler of the IC card after at least one of the plurality of memory blocks of reduced size is stored in a first data buffer of the IC card.

4. The method according to claim 3 wherein the writing is activated by the scheduler after one of the plurality of memory blocks of reduced size stored in the first data buffer is decompressed and stored in a second data buffer of the IC card.

5. The method according to claim 4 wherein the decompressing and the writing are contemporaneously activated by the scheduler on a memory block of reduced size and on a memory block of set size respectively stored in the first data buffer and the second data buffer.

6. A method for pre-programming a memory of an integrated circuit (IC) card with a memory image of a gold version factory sample IC card, the method comprising:
   dividing the memory image into a plurality of memory blocks of a set size;
   compressing the plurality of memory blocks of set size into a corresponding plurality of memory blocks of reduced size;
   separately transmitting the plurality of memory blocks of reduced size to the IC card;
   decompressing the plurality of memory blocks of reduced size into the plurality of memory blocks of set size; and
   writing at least one memory block in the memory while at least one memory block is transmitted, the decompressing and the writing being contemporaneously performed.

7. The method according to claim 6 wherein the storing further comprises writing at least one decompressed memory block in the memory of the IC card while at least one compressed memory block is transmitted and decompressed.

8. The method according to claim 7 wherein at least one of the decompressing and the writing is activated by a scheduler of the IC card, respectively, after at least one of the plurality of compressed memory blocks of set size is stored in a first data buffer of the IC card and after at least one of the plurality of decompressed memory blocks is stored in a second data buffer of the IC card.

9. An integrated circuit (IC) card comprising:
   a memory and receiver cooperating therewith and being configured to pre-program said memory by at least receiving a memory image of a gold version factory sample IC card and storing the memory image in said memory;
   said memory comprising a first data buffer configured to store at least one memory block of set size of the memory image while at least one transmitted memory block is received by said receiver.

10. The IC card according to claim 9 further comprising a decompressing module configured to decompress the at least one memory block of set size stored in said first data buffer.

11. The IC card according to claim 10 wherein said receiver is configured to store the at least one memory block of set size in said first data buffer; and wherein said memory further comprises a second data buffer configured to store decompressed memory blocks.

12. The IC card according to claim 11 further comprising a scheduler having an input connected to outputs of said decompressing module, said memory, and said receiver and having an output configured to be connected to inputs of said decompressing module, said memory, and said receiver.

13. The IC card according to claim 12 wherein the input of said scheduler is configured to receive at least one of an interrupt signal from the output of said decompressing module when a memory block has been decompressed, an interrupt signal from the output of said memory when a memory block has been written in said memory, and an interrupt signal from the output of said receiver when a memory block has been received.

14. The IC card according to claim 12 wherein the output of said scheduler is configured to send an activation command to the input of said decompressing module when a memory block is stored in said first data buffer to be decompressed.

15. The IC card according to claim 12 wherein the output of said scheduler is configured to send an activation command to the input of said memory when a memory block is stored in said second data buffer to be written in said memory.

* * * * *